United States Patent [19]

Siwek

[11] Patent Number: 5,078,453
[45] Date of Patent: Jan. 7, 1992

[54] SIMULATED CAP SCREW AND WHEEL ASSEMBLY

[75] Inventor: Bernard Siwek, Buena Park, Calif.

[73] Assignee: Kelsey-Hayes Company, Romulus, Mich.

[21] Appl. No.: 389,433

[22] Filed: Aug. 4, 1989

[51] Int. Cl.$^5$ ............................................. B60B 7/00
[52] U.S. Cl. .................................... 301/37 R; 301/65; 411/337
[58] Field of Search .................... 301/37 R, 37 P, 65, 301/10 R, 10 DC, 11 R, 37 T; 4/286, 295; 428/542.2; 411/337, 371; 52/514

[56] References Cited

U.S. PATENT DOCUMENTS 3,665,800   5/1972   Ryder .................................. 411/337

FOREIGN PATENT DOCUMENTS 8703942   7/1987   World Int. Prop. O. .......... 411/371

Primary Examiner—Russell D. Stormer
Attorney, Agent, or Firm—MacMillan, Sobanski & Todd

[57] ABSTRACT

An improved cap screw, an improvement in cooperating cap screw and bore configurations and an improved method for retaining decorative cap screws on an object are disclosed. The cap screw comprises a proximate end provided with a decorative configuration and a distal portion provided with frictional retention means for engaging a side wall defining a cap screw bore in an object. The cap screw is configured to be received in a substantially cylindrical bore defined by a substantially cylindrical side wall having a given diameter. In one embodiment, the proximate end has a diameter which is less than the given diameter and the distal portion has a diameter corresponding with the given diameter. The cap screw includes a distal end provided with a decorative configuration in a reversible embodiment of a cap screw according to the present invention.

9 Claims, 3 Drawing Sheets

SIMULATED CAP SCREW AND WHEEL ASSEMBLY

BACKGROUND OF THE INVENTION

This invention relates to the field of simulated cap screws which are used for decorative purposes in a number of products, including vehicle wheels. More specifically, the invention is concerned with cap screws that are received in bores as well as cooperating cap screw and bore configurations for retaining cap screws in the bores.

A known wheel includes a plurality of machined bores adapted to receive a known cap screw. Each bore has an inner portion with a first diameter, a central portion of a second diameter greater than the first diameter and an outer portion of a third diameter greater than the second diameter. Each portion of the bore is separated from an adjacent portion by a shoulder. The known cap screw comprises a cap end and a shank end. The cap end is adapted to be received in the central portion of the bore of an associated wheel and the shank end is adapted to be received in the inner portion of the bore. The shank end is provided with ribs to frictionally engage the side wall which defines the inner portion of the bore to retain the cap screw therein. Further details about this known construction are discussed hereinafter with reference to some of the attached drawings.

The instant invention is based upon the discovery of an improved cap screw, an improvement in cooperating cap screw and bore configurations and an improved method for retaining decorative cap screws in place. The cap screw comprises a proximate end provided with a decorative configuration and a distal portion provided with frictional retention means for engaging the side wall defining a cap screw bore. The cap screw is configured to be received in a bore defined by a substantially cylindrical side wall having a given diameter. The cap screw may include a distal end provided with a decorative configuration in a reversible embodiment of a cap screw according to the present invention.

DETAILED DESCRIPTION OF THE INVENTION

Figure 1:
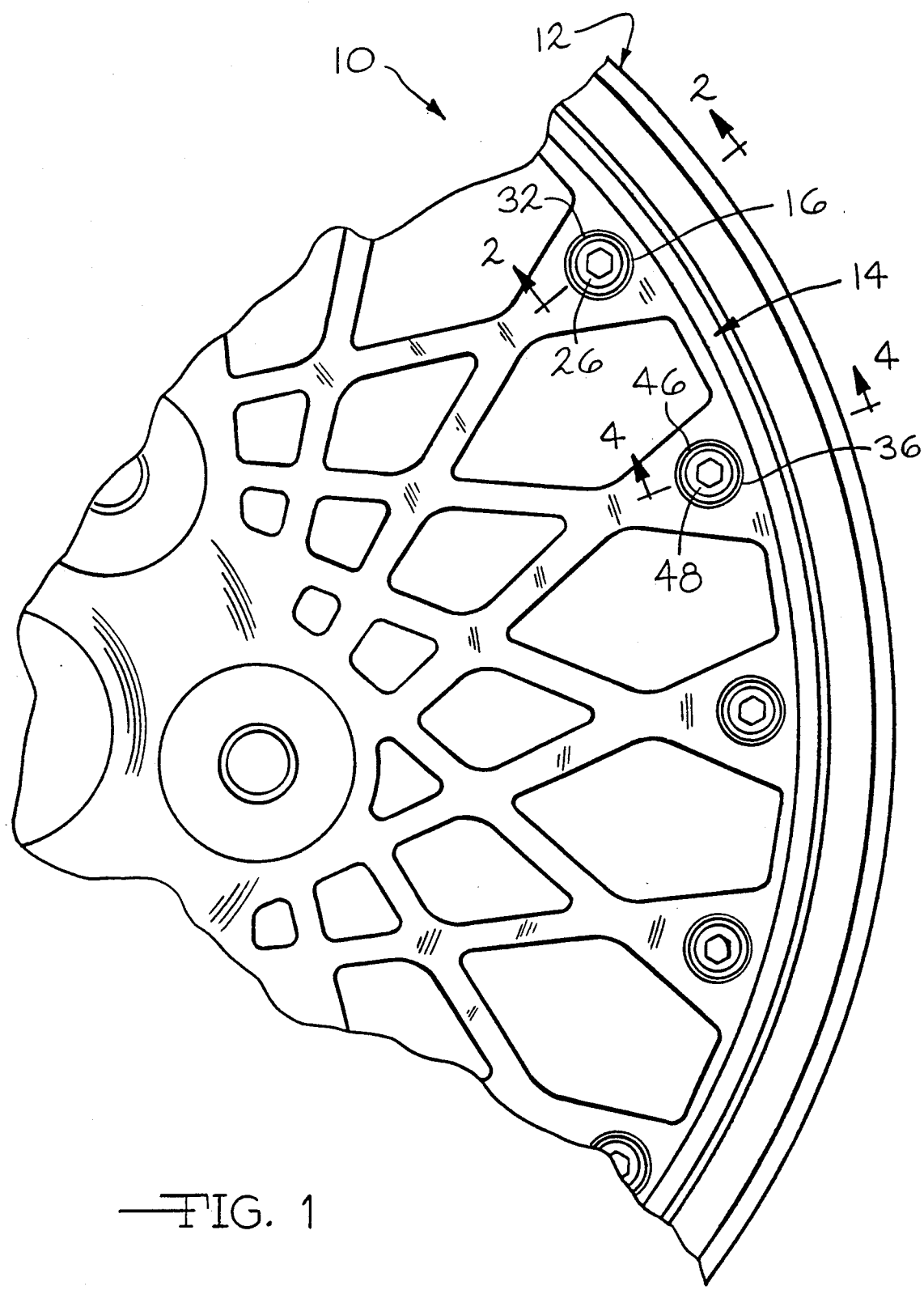
FIG. 1 is a partial front view of a wheel including a plurality of decorative cap screws received in cap screw bores.

With reference to FIG. 1, a portion of a one piece cast aluminum wheel is indicated generally at 10. The wheel 10 is designed to simulate a two piece wheel consisting of a rim 12 and a disc or spider 14 secured thereto by a plurality of cap screws, one of which is indicated at 16. The rim 12 and disc 14 are, in fact, integral and the cap screws 16 are decorative. The cap screw 16 is illustrated as having an Allen Screw configuration on the exposed end. It will be appreciated that other decorative configurations may be incorporated in a cap screw according to the invention.

Figure 2:
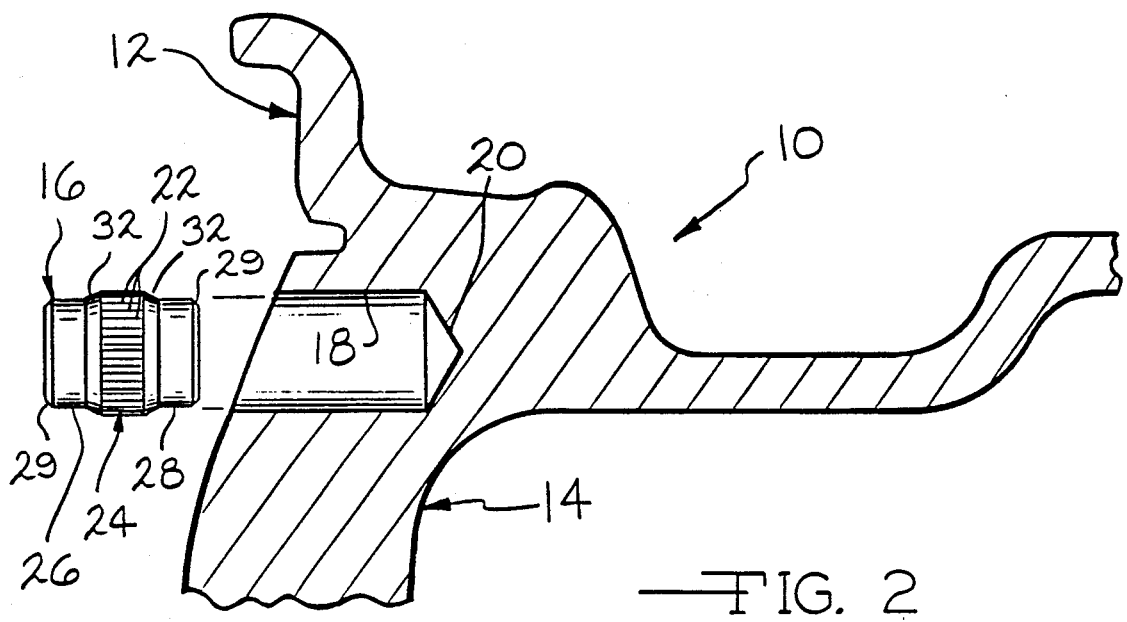
FIG. 2 is a sectional view of the wheel, taken along the line 2—2 of FIG. 1, and illustrating a cap screw bore and a cap screw according to the invention, prior to insertion of the cap screw into the cap screw bore.
Figure 3:
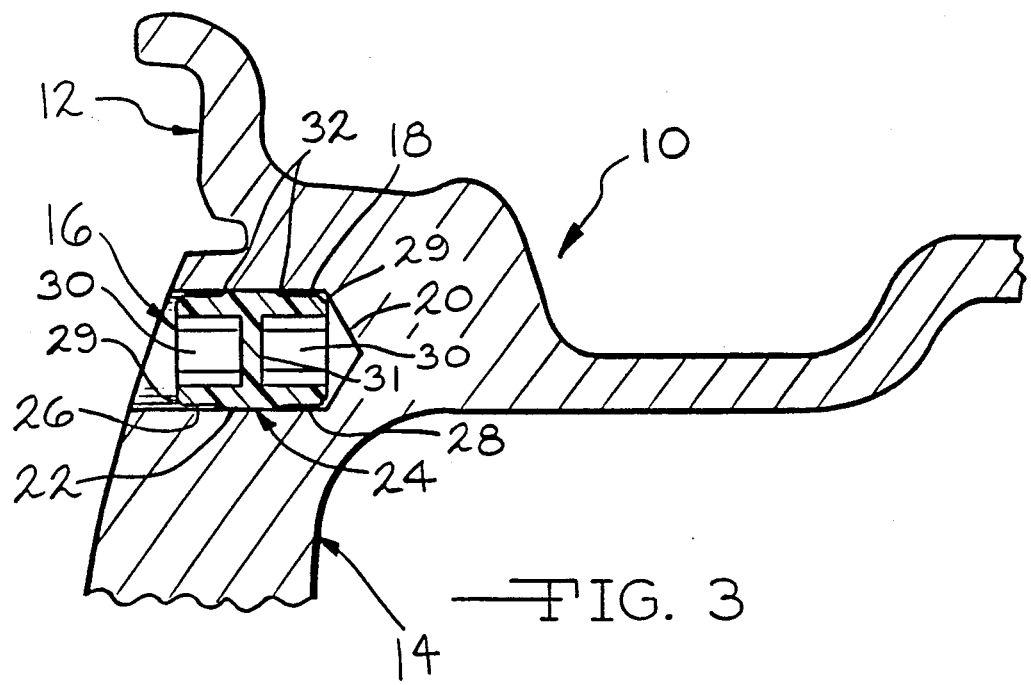
FIG. 3 is a view corresponding with FIG. 2, but illustrating the cap screw, in section, after it has been inserted into the bore.

Referring now to FIG. 2, a cap screw bore is defined by a cylindrical side wall 18 and a conical bottom 20. A plurality of ribs 22 are disposed around the circumference of a center section 24 of the cap screw 16. The ribs 22 are oriented axially relative to the cap screw 16 and extend radially outwardly therefrom a small distance. The cap screw 16 and the ribs 22 are sized, relative to the side wall 18 of the cap screw bore, so that the ribs 22 frictionally engage the side wall 18 and retain the cap screw 16 in the cap screw bore, as shown in FIG. 3.

The cap screw 16 has first and second, substantially cylindrical ends 26 and 28. The ends 26 and 28 are provided with chamfered surfaces 30. In the illustrated embodiment, end 26 is a proximate end because of its proximity to the open end of the cap screw bore, as shown in FIG. 3, and end 28 is a distal end. The ends 26 and 28 of the cap screw 16 are, preferably, both provided with a decorative configuration so that the cap screw 16 is reversible. In this embodiment, either one of the ends 26 or 28 can be inserted first into the cap screw bore. The end which is inserted first will be the distal end. Since there is no need to orient the ends 26 and 28 of the cap screw 16 before it is inserted in a cap screw bore, insertion time will be reduced by comparison with the insertion time for a cap screw in which only one end is provided with a decorative configuration. Also, as shown in FIG. 3, in each of the ends 26 and 28, six side walls define an internal cavity 30 having a hexagonal Allen configuration. The bottom of each cavity 30 is defined by a common bottom wall 31 which is positioned, axially, in the center of the cap screw 16.

There is a beveled surface 32 between the center section 24 and each of the two cap screw ends 26 and 28. Each end 29 of the end portions 26 and 28 has a smaller diameter than the side wall 18 so that there is a small clearance, as shown in FIG. 3, between the cap screw ends 29 and the cylindrical side wall 18 of the cap screw bore, simulative of the clearance that might be provided between a bore and the head of a cap screw.

The cap screw 16 is preferably molded from a polymer such as DuPont's "Delrin", a stabilized methanol polymer with excellent strength and ease of molding properties. Cap screws according to the invention can be produced from other materials, the identity of which will occur to those skilled in the art. Other polymers are suitable as well as metals and composite materials.

Figure 4:
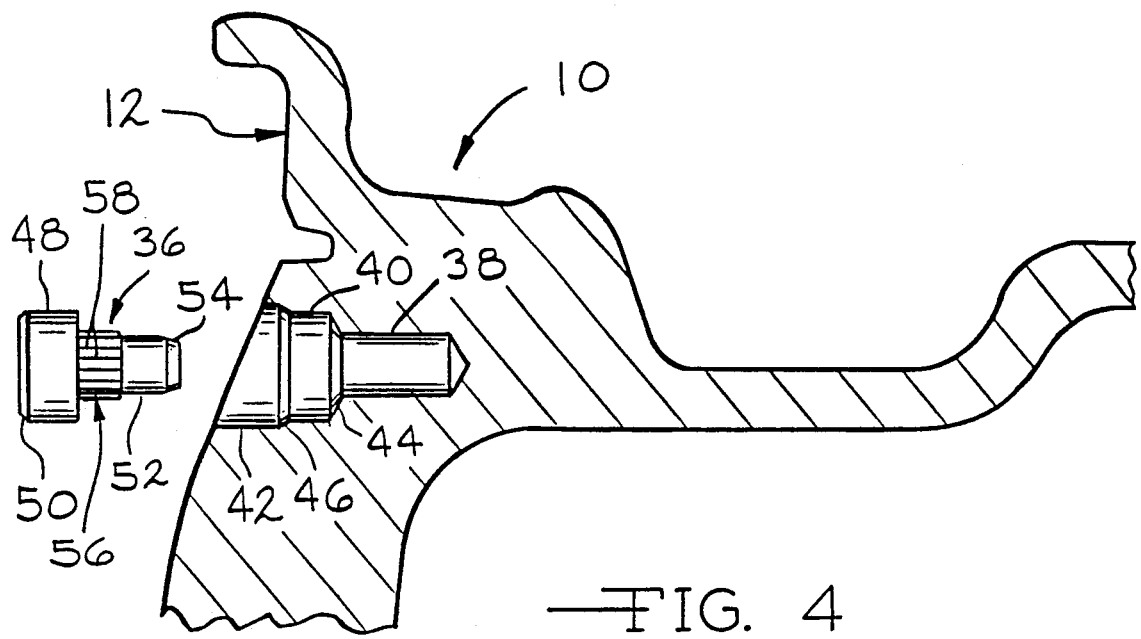
FIG. 4 is a sectional view of the wheel, taken along the line 4—4 of FIG. 1, and illustrating a prior art cap screw bore and a prior art cap screw, prior to insertion thereof in the bore.

With reference to FIG. 4, a known cap screw 36 is illustrated prior to insertion thereof in a known cap screw bore provided in the wheel 10. The cap screw bore has two shoulders defined between three cylindrical side walls. Specifically, there is an inner cylindrical side wall 38 having a first diameter, a central cylindrical side wall 40 having a second diameter which is greater than the first diameter and an outer cylindrical side wall 42 having a third diameter which is larger than the second diameter. A shoulder 44 separates the inner side wall 38 from the central side wall 40, which in turn, is separated from the outer cylindrical side wall 42 by a shoulder 46.

Figure 5:
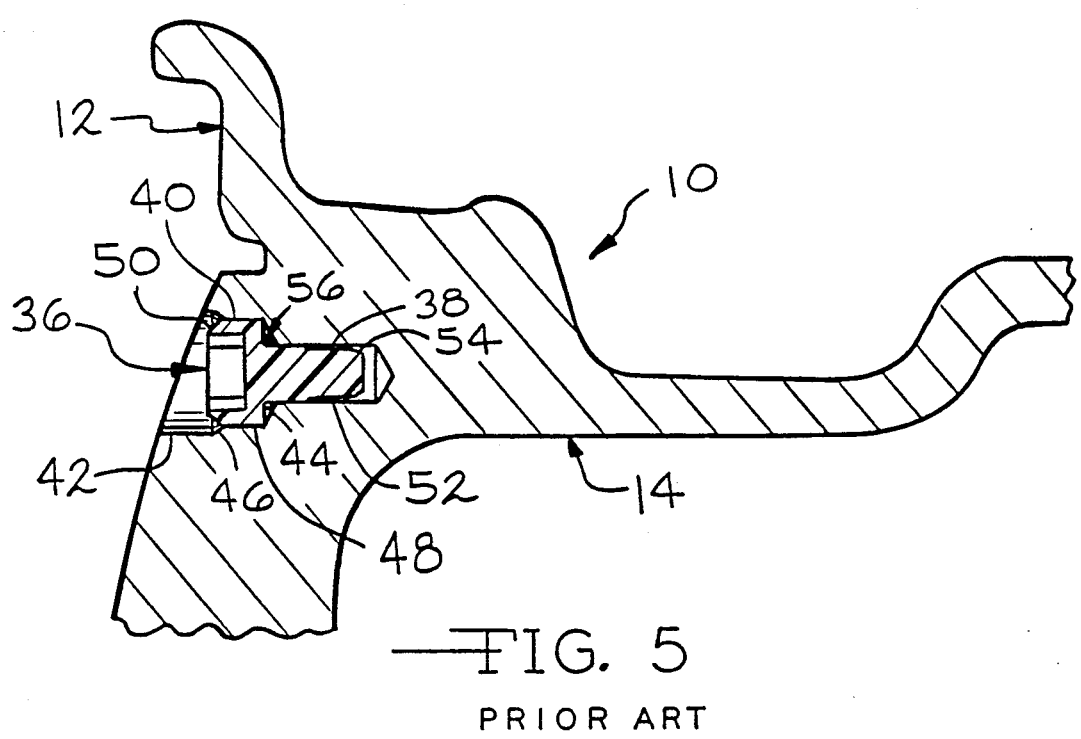
FIG. 5 is a view corresponding with FIG. 4, but illustrating the cap screw, in section, after it has been inserted in the bore.

The cap screw 36 comprises an outer, proximate end 48 which is provided with a chamfered surface 50. The proximate end 48 of the cap screw 36 includes a decorative Allen Screw configuration, as shown in FIG. 1. The cap screw 36 further comprises an inner or distal end 52 which includes a chamfered surface 54. A central portion 56 of the cap screw 36 includes a plurality of ribs 58 disposed circumferentially therearound. The central portion 56 and the ribs 58 thereon are sized, relative to the inner cylindrical side wall 38, so that the ribs 58 frictionally engage the side wall 38 to retain the cap screw 36 in the bore, as shown in FIG. 5. The distal end 52 is solid; there is no cavity defined therein.

It should be appreciated that, from the front, as shown in FIG. 1, a cap screw 16 and wheel assembly according to the invention looks very much like the known cap screw 34 and wheel assembly except that, in the former, beveled surface 32 of the cap screw 16 can be seen around the end 26 whereas, in the latter, the bore shoulder 46 can be seen around the cap screw end 48. However, from a manufacturing standpoint, a cap screw and wheel assembly according to the present invention is very different from the known cap screw and wheel assembly. The cap screw bore illustrated in FIGS. 2 and 3 can be machined with a simple bit while a complex machining operation or a complex bit is needed to produce the complex cap screw bore illustrated in FIGS. 4 and 5. It will be appreciated that a straight bore can accommodate a cap screw, according to the present invention, which has a first, proximate, decorative end and a second, distal end or distal portion provided with frictional retention means. Additionally, as discussed above, the cap screw bore illustrated in FIGS. 2 and 3 can receive a reversible cap screw. However, the cap screw bore illustrated in FIGS. 4 and 5 cannot receive a reversible cap screw because the end 48 of the cap screw 36 is too large to be positioned distally in the known cap screw bore.

The foregoing description is intended to enable one skilled in the art to practice the invention. The description sets forth the best mode presently known to the inventor for carrying out the invention, although it is recognized that modifications thereto will occur to those skilled in the art. Such modifications, though not specifically disclosed, may nonetheless fall within the spirit and scope of the appended claims.

I claim:

1. A reversible, decorative cap screw adapted to be inserted and retained in a bore defined by a cylindrical side wall of a given diameter, said cap screw comprising:
   a substantially cylindrical central portion having a first outer diameter;
   first and second cylindrical ends connected to and extending from said central portion, said first and second cylindrical ends each having outer diameters less than said first outer diameter, said ends defining internal cavities;
   a common wall disposed in said central portion, said wall constituting the bottom of both of said cavities; and
   ribs connected to and extending from said central portion for frictionally engaging the cylindrical side wall of the bore and retaining said cap screw therein.

2. A cap screw for a vehicle wheel having a bore with side walls for receiving said cap screw, said cap screw comprising:
   a body defining an axis and including an axially extending central portion having first and a second axially extending ends connected thereto;
   said central portion defining a central outer periphery provided with gripping means for frictionally engaging the side walls of the bore;
   said first end defining a first outer periphery and said second end defining a second outer periphery; and
   both of said first and second outer peripheries wholly contained within an axially extending boundary defined by said central outer periphery such that said cap screw is reversible and can be inserted into the bore in either direction and retained therein by said gripping means.

3. The cap screw defined in claim 2 wherein the bore is cylindrical and said outer central periphery of said central portion is cylindrical and defines a central outer diameter.

4. The cap screw defined in claim 3 wherein said first and second outer peripheries are cylindrical and define first and second outer diameters which are less than said central outer diameter.

5. The cap screw defined in claim 4 wherein said first and second outer diameters are equal.

6. The cap screw defined in claim 5 and further including an axially extending decorative cavity formed in each of said first and second ends.

7. The cap screw defined in claim 6 wherein said gripping means includes a plurality of radially extending ribs provided on said central portion.

8. The cap screw defined in claim 2 wherein said gripping means includes a plurality of radially extending ribs provided on said central portion.

9. The cap screw defined in claim 2 and further including an axially extending decorative cavity formed in each of said first and second ends.

* * * * *